United States Patent [19]
Brogardh et al.

[11] Patent Number: 4,492,860
[45] Date of Patent: Jan. 8, 1985

[54] OPTICAL MEASURING DEVICE WITH MEANS FOR SUPPRESSING REFLECTIONS

[75] Inventors: Torgny Brogårdh; Anders Linge; Lars Sander, all of Västerås, all of Sweden

[73] Assignee: Asea Aktiebolag, Västerås, Sweden

[21] Appl. No.: 326,057

[22] Filed: Nov. 30, 1981

[30] Foreign Application Priority Data

Dec. 1, 1980 [SE] Sweden .................................. 8008423

[51] Int. Cl.³ ................................................ G02B 5/14
[52] U.S. Cl. ................................. 250/227; 250/231 R
[58] Field of Search ..................... 250/225, 227, 231 R

[56] References Cited

U.S. PATENT DOCUMENTS

| 3,675,125 | 7/1972 | Jaecklin | 250/225 X |
| 3,743,929 | 7/1973 | Lesueur | 250/225 |
| 3,754,143 | 8/1973 | Lesueur | 250/225 |

FOREIGN PATENT DOCUMENTS

1245472  9/1971  United Kingdom .
2034460A 6/1980  United Kingdom .

Primary Examiner—David C. Nelms
Attorney, Agent, or Firm—Watson, Cole, Grindle & Watson

[57] ABSTRACT

The present invention relates to an optical measuring device for measuring physical quantities, comprising a measuring transducer and an evaluating electronic unit, interconnected by a light-transmitting system and photo-optic devices for coupling in light from a light source to the system, and for coupling out light from the system to photo-detector devices in the electronic unit. The measuring device comprises a first element for polarizing the light from the light source and a second element for polarizing the light to the photo-detector devices, the difference in the direction of polarization between the two polarizing elements being chosen so that light reflections in the system in and adjacent to the evaluating electronic unit are substantially blocked from the photo-detector devices by the second polarizing element.

10 Claims, 7 Drawing Figures

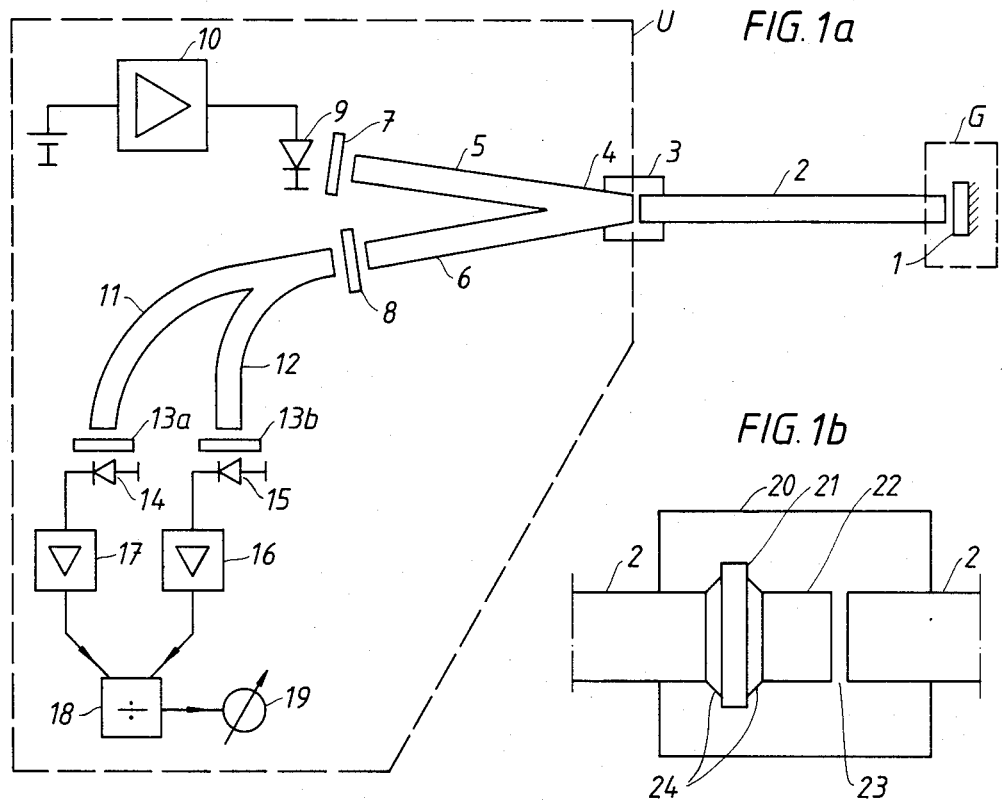
FIG. 1a
FIG. 1b
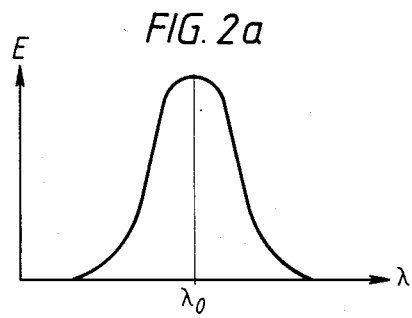
FIG. 2a
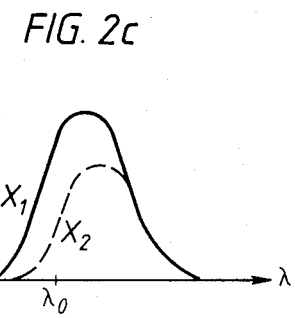
FIG. 2c
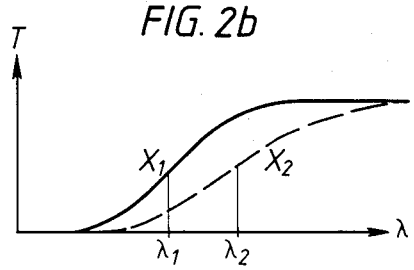
FIG. 2b
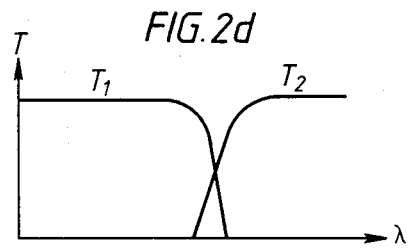
FIG. 2d

OPTICAL MEASURING DEVICE WITH MEANS FOR SUPPRESSING REFLECTIONS

TECHNICAL FIELD

The present invention relates to an optical measuring device for measuring a physical quantity, which comprises a measuring transducer and an evaluating electronic unit, which are interconnected by a light-transmitting system, and comprising means for coupling light from a light source means into said system and for coupling light leaving said system to a photo-detector means in said electronic unit.

Measuring devices of the kind described above suffer from a disadvantage that because of reflections arising at joints and branches in optical fibers defining the light-transmitting system, the calibration curve for the measuring device is affected in a non-desirable manner.

Throughout this specification the references to "light" should be taken to include not only electromagnetic radiation in the visible spectrum, but also radiation in the ultraviolet and infra-red regions of the spectrum.

DISCLOSURE OF THE INVENTION

The device according to the invention aims to provide a solution to these problems and to other problems associated therewith and is characterised in that the measuring device comprises a first element for polarizing the light entering the light-transmitting system from the light source means (one or more light sources) and a second element for polarizing the light fed to the photo-detector means (one or more photo-detectors) the difference in the direction of polarization between the two polarizing elements being chosen so that reflections in the system in and adjacent to the evaluating electronic unit are substantially blocked from the photo-detector means by the second polarizing element. This results in an optical measuring device (e.g. with a single fiber between the measuring transducer and the evaluating electronic unit), where reflections from joints and branches in the system are suppressed by said polarizers.

The incident light from the light source means is polarized by the first polarizer element, and since the direction of polarization is maintained only one or a few decimeters into a multimode optical fiber, reflections arising at branches and joints in the fiber in the vicinity of the first polarizer element will still be polarized and can therefore be eliminated by the second element in front of the photo-detector means. The light arriving at the second element from the measuring transducer will have become largely depolarized and is therefore only lightly attenuated by the second element on its way to the photo-detector means. This construction of the optical transmission system enables joints and other than optically perfect branches to be used in a fiber optical measuring system for absorption measurements.

BRIEF DESCRIPTION OF DRAWINGS

The invention will now be described in greater detail, by way of example, with reference to the accompanying drawings, in which:

FIG. 1a shows, schematically, one example of a measuring device according to the invention, FIG. 1b shows how a polarizer can be used for reducing reflections at fiber joints, FIGS. 2a, 2b, 2c and 2d show different spectra occurring in the device of FIG. 1.

DESCRIPTION OF PREFERRED EMBODIMENTS

Figure 3:
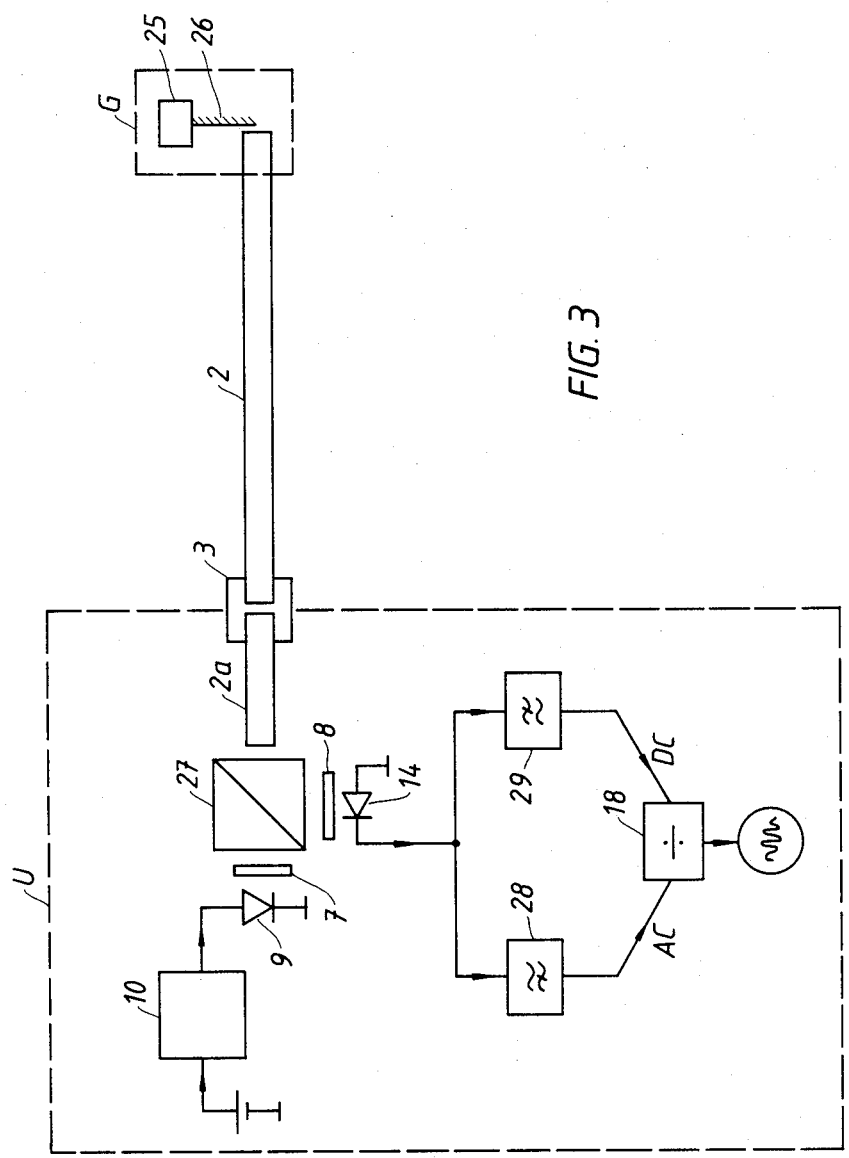
FIG. 3 shows an alternative embodiment of measuring device according to the invention.

A considerable problem in the use of fiber optical systems for quantitative measurement purposes arises because of unpredictable reflections which occur at joints and branches in the optical transmission system. A measuring device which avoids these problems is illustrated in FIG. 1a. Incident light from a source 9, which is energised from an amplifier 10, is conducted via a light conductor 5, a branch 4, a joint 3 and a light conductor 2 to a measuring transducer (G) comprising a sensor 1. Light emitted from the sensor 1 will return along the conductor 2 to a further fiber 6 via the branch 4. Along the optical path 5-2, some incident light will be reflected by the branch 4 and the joint 3 directly into the fibre 6, whereby an undesirable light signal is received by photo-detectors 14 and 15 (familiar from prior art devices) and employed to sense the transducer-emitted light. The sensor 1 has a transmission spectrum which is influenced by the quantity to be measured. Thus, the incident light is subjected to a wavelength-dependent attenuation in its passage through the sensor material. After reflection from a reflecting surface at the back side of the sensor 1, the light makes a second pass through the sensor and is then led back through the light conductor 2 to the detectors 14 and 15 via the joint 3, the light conductor 6 and further light conductors 11 and 12. The detector 15 senses that part of the light spectrum transmitted by a filter 13b, whereas the detector 14, which is provided with a different filter 13a, senses a different part of the light spectrum. After amplification of the detected signals by amplifiers 16 and 17, a quotient of the amplified signals is formed in a dividing unit 18, the output of which represents a measuring signal which is insensitive to a varying attenuation in the fiber 2. This measuring signal is fed to a suitable registering or recording device 19.

Examples of the spectral relationships which can be used in the device of FIG. 1 are shown in FIGS. 2a to 2d. FIG. 2a shows the emission spectrum of the incident light from the source 9, which is suitably an LED. The sensor 1 has a transmission spectrum as shown in FIG. 2b, in which the continuous curve with the transmission edge wavelength $\lambda_1$ corresponds to a first value $X_1$ of the quantity being measured and the dash-line curve with the edge wavelength $\lambda_2$, corresponds to a second value $X_2$. At the value $X_1$ the spectrum of the light from the sensor 1 will have a distribution according to the continuous curve shown in FIG. 2c, and at the value $X_2$ a distribution according to the dash-line curve in the same Figure. The detector 14 is sensitive to the left-hand part of the spectrum shown in FIG. 2c, by virtue of viewing through the optical filter 13a which has the transmission curve $T_1$ shown in FIG. 2d, and is thus influenced to a greater extent by changes in the measuring signal, than the detector 15, which is sensitive to the right-hand part of the spectrum of FIG. 2c, by virtue of the filter 13b, which has the transmission curve $T_2$ shown in FIG. 2d.

One problem which arises when measuring the spectral distribution of the light from the sensor 1, is that reflections from the branch 4 and the joint 3 cause a few percent of the incident light in the fiber 5 (which has the spectrum according to FIG. 2a), to be added to the spectrum according to FIG. 2c, thus influencing the calibration curve of the measuring apparatus. To avoid this, a polarizer 7 is mounted between the source 9 and the inlet to the light conductor 5, and another polarizer 8 is mounted between the outlet of the fiber 6 and the light conductors 11 and 12 leading to the detectors 14 and 15. By rotating the polarizers 7 and 8 relative to one another, the reflections arising in the branch 4 and at the joint 3 may be more or less neutralized. Because of depolarization which occurs in the long conductor 2 and/or at the sensor 1, the light emitted from the sensor 1 will be largely unpolarized when it reaches the polarizer 8, so that a fairly large proportion of this sensor-emitted light is allowed to pass through to the filters 13a and 13b.

If the direction of polarization introduced by the polarizer 7 is conserved in the conductor 2, the transducer G may include a quarter-wave plate, a double-refracting crystal or some other optical arrangement, which rotates the plane of polarization, provides circular-polarized, elliptically polarized or unpolarized light, whereby the light emitted from the sensor 1 will pass through the polarizer 8 to a substantial extent. In such a case, for example when using monomode fibers, joints may be tolerated at any position along the fiber 2 and not only close to the branch 4.

To reduce the disturbing effect of reflections arising at a joint in the conductor 2 at such a distance from the polarizer 7 that the incident light there is depolarized (i.e. when using a conductor 2 which does not maintain the direction of polarization over a large distance), a special joint 20 as shown in FIG. 1b may be used. The light in the light conductor 2 is allowed to pass through a further polarizer 21 and an optical element 22 which adjusts the direction of polarization, before it reaches an air gap 23 in the joint. The optical element 22, which adjusts the direction of polarization performs an approximately 90° overall rotation of the plane of polarization of light which has passed twice through the element 22, after being reflected at the air gap 23. In this way, incident light reflections occurring at the joint are neutralized. Since the incident light crossing the gap 23 is depolarized on its way from the joint 20 to the sensor 1 and back to the joint 20 again, or because the transducer G contains an optical component which provides circularly or elliptically polarized sensor-emitted light 1, the sensor-emitted light will to some extent always be able to pass through the polarizer 21 on its way back to the evaluating unit U. To reduce reflections at the transition between the conductor 2 and the polarizer 21 and at the transition between the polarizer 21 and the optical element 22, an index-matching medium 24 is employed.

FIG. 3 shows a somewhat different measuring device which again employs polarizers for preventing reflections in the optical system affecting the quantitative measurements being made. Similar reference numerals have been used in FIG. 3 as were used in FIG. 1a to designate similar components in the two devices. The source 9, which is energised by the amplifier 10, sends a continuous beam of light through the polarizer 7, a beam divider 27, the joint 3 and the conductor 2 to be forwarded to the transducer G, which here consists of a vibrating component 25 mechanically coupled to a mirror 26. Part of the incident light is reflected by the mirror 26, is conducted along the light conductor 2 via the joint 3 to the beam divider 27, from which it is reflected through the polarizer 8 to the photo-detector 14. The beam divider 27 can be constructed to have polarizing properties, in which case the polarizers 7 and 8 may not be needed. The signal from the detector 14 will contain a DC component, which is a measure of the mean position of the mirror 26, and an AC component, which represents the vibration signal. By means of a high-pass filter 28, the AC component is isolated and by means of a low-pass filter 29, the DC component is isolated. By quotient formation in the unit 18, between the AC and DC components, an AC signal is obtained, which is compensated for variations in the attenuation of the optical transmission system and for changes in the emission of the light source 9. The effect of light reflections arising from the beam divider 27, the end surfaces of a fiber part 2a and the end surface of the fiber 2 in the joint 3, is eliminated by the polarizer 8, which is adjusted so that the incident light polarized by the polarizer 7 is more or less extinguished. The light, which arises from reflections at the mirror 27, has become depolarized in the conductor 2 and will therefore not be completely blocked by the polarizer 8.

The devices described above may be varied in many ways within the scope of the following claims.

We claim:

1. An optical measuring device for measuring a physical quantity, comprising:
   a light source means adapted to generate incident light,
   a measuring transducer exposed to the quantity to be measured and responsive to the incident light and able to modify the latter in response to changes in the quantity to be measured,
   photo-detector means to respond to light coming from said measuring transducer and to produce electrical signals therefrom,
   electronic means to process said signals and produce an output indicative of the quantity to be measured,
   a light-transmitting system comprising a single optical fiber, the means for coupling incident light into said single fiber and modified light out of said single fiber consisting of a fiber optical Y-branch,
   said light-transmitting system feeding incident light from said light source means to said measuring transducer and feeding modified light from said measuring transducer to said photo-detector means,
   a first element for polarizing the incident light entering said light-transmitting system from said light source means, and a second element for polarizing the light fed to the photo-detector means,
   the difference in the direction of polarization between the two polarizing elements being chosen so that a direct path for light from said light source means to said photo-detector means via reflections in said light-transmitting system in and adjacent to the photo-detector means are substantially blocked from said photo-detector means by said second polarizing element, thus preventing said reflected signal from interfering with the measurement result, thus light polarized in one direction, and being reflected, being blocked in a polarizing device for polarization in another direction.

2. An optical measuring device according to claim 1, further comprising an additional polarizer element mounted upstream, relative to incident light passage, of each joint of said light transmitting system together with a further element adjusting the direction of polarization in such a manner that the incident light from the light source means on its way to said joint is adapted first to pass the additional polarizer element and thereafter the further element adjusting the direction of polarization, which further element rotates the direction of polarization through approximately 45° on each pass therethrough, so that incident light reflected from the said joint is rotated approximately 90° overall and such reflections are thus at least to a certain extent neutralized.

3. A fiber optical measuring device according to claim 2,
wherein said light-transmitting system comprises a single optical fiber and in that an index-matching medium is applied between said single fiber and the additional polarizer element and between the further element and the additional polarizer element.

4. An optical measuring device according to claim 1, wherein the spectrum of said measuring transducer is influenced by the quantity being measured, and that the light source means emits incident light in a wavelength range in which said spectrum has an edge, and that the modified light which returns from the measuring transducer to the photo-detector means is detected in two non-identical wavelength intervals by two different photo-detectors.

5. An optical measuring device according to claim 1, wherein said measuring transducer comprises an optical filter for generating a reference signal in one wavelength interval and a measuring signal in another, non-identical wavelength interval.

6. An optical measuring device according to claim 1, wherein the spectrum of said measuring transducer is influenced by the quantity being measured, and that the light source means emits incident light in a wavelength range in which said spectrum has an edge, and that the modified light which returns from the measuring transducer to the photo-detector means is detected in two non-identical wavelength intervals by two different photo-detectors.

7. An optical measuring device according to claim 2, wherein said measuring transducer comprises an optical filter for generating a reference signal in one wavelength interval and a measuring signal in another, non-identical wavelength interval.

8. An optical measuring device according to claim 1, wherein said measuring transducer comprises an optical filter for generating a reference signal in one wavelength interval and a measuring signal in another, non-identical wavelength interval.

9. An optical measuring device according to claim 1, wherein said light-transmitting system includes a light conductor for conducting said modified light from said measuring transducer to said photo-detector means.

10. An optical measuring device according to claim 1, wherein said measuring transducer further includes means for depolarizing at least a portion of the light incident thereon.

* * * * *